July 9, 1963 E. C. PETERSON 3,096,642
SURFACE TENSION MEASURING DEVICE
Filed April 15, 1960 2 Sheets-Sheet 1
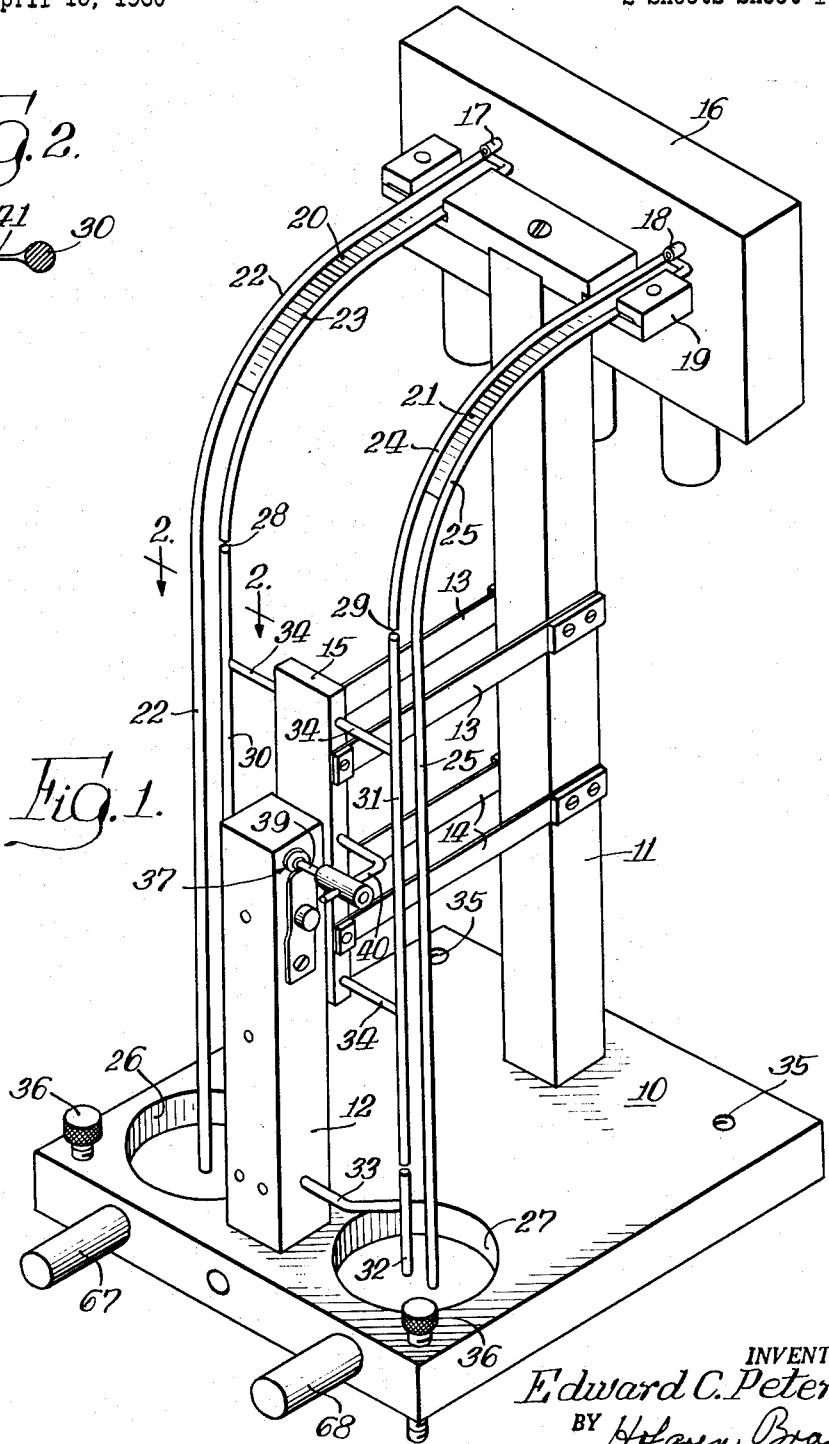
INVENTOR.
Edward C. Peterson,
BY Hofgren, Brady,
Wegner, Allen & Stellman Attys.

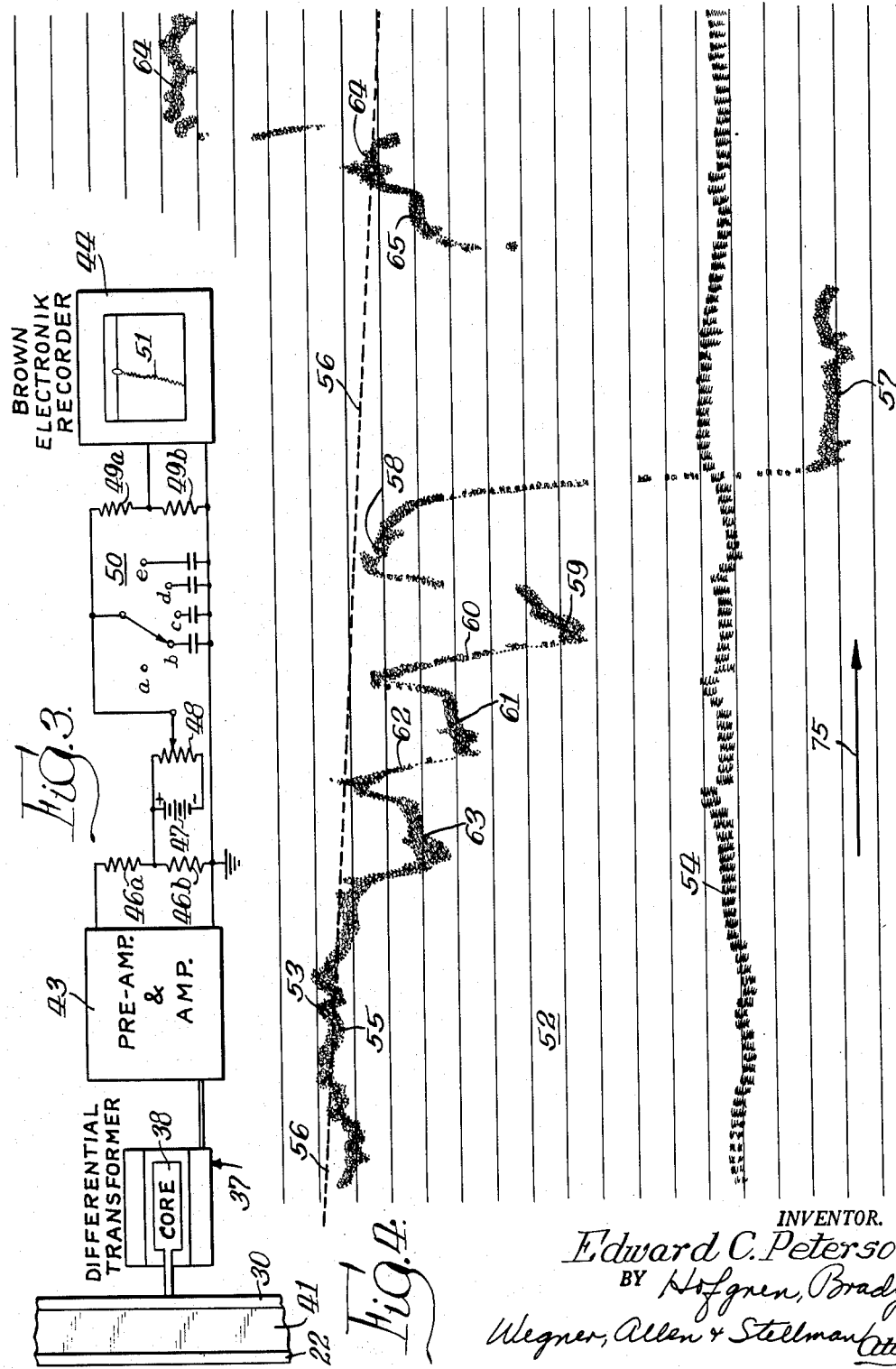

United States Patent Office 3,096,642
Patented July 9, 1963

3,096,642
SURFACE TENSION MEASURING DEVICE
Edward C. Peterson, Benton Harbor, Mich., assignor to Whirlpool Corporation, a corporation of Delaware
Filed Apr. 15, 1960, Ser. No. 22,627
12 Claims. (Cl. 73—53)

This invention relates to a device for indicating the surface tension of a liquid.

When liquids such as water contain solutes or other materials such as detergents or surface active agents associated therewith, the surface tension of these liquids vary depending upon the quantity of the solute. This provides a ready means for indicating or monitoring the change in solutes by monitoring or indicating the surface tension of the resulting liquid. The invention here, therefore, is concerned with a device for indicating the surface tension of such a liquid and preferably for continuously indicating the surface tension and therefore changes in surface tension of a liquid in which the surface tension conditions are continuously changing.

The device of this invention has found an important use in the continuous monitoring of surface tensions of laundry liquids to indicate relative amounts of detergent or surface active agent in the liquid as well as in the rinse water during the rinsing operation. Thus, the device is usable not only to indicate the relative amount of detergent, for example, in the liquid but also to indicate when substantially all detergent has been rinsed from the article within the piece of laundry equipment. The device for indicating surface tension and changes in surface tension is also useful in many other industries such as brewing, petroleum, detergent, textile, metal dipping, distilling, paint and similar industries wherein it is necessary to control accurately the addition of ingredients to liquids when these ingredients have an effect on the surface tension of the resulting liquid mixture.

One of the features of this invention is to provide an improved device for indicating the dynamic surface tension of a liquid.

Another feature of the invention is to provide such an improved device including a pair of spaced apart members, one of which is movable, together with means for flowing liquid between the members to form a film therebetween in combination with means for indicating the degree of movement of the movable member to indicate surface tension of the liquid film and thus of the liquid itself.

A further feature of the invention is to provide an improved device for continuously indicating the surface tension of a first unknown liquid as compared to the surface tension of a second known liquid in which the surface tension forces of the two liquids function to nullify each other so that the resulting effect is an indication of the surface tension of the unknown liquid.

Other features and advantages of the invention will be apparent from the following description of one embodiment thereof taken in conjunction with the accompanying drawings. Of the drawings:

FIGURE 1 is a perspective view of a device embodying the invention.

FIGURE 2 is a horizontal sectional view taken substantially along the line 2—2 of FIGURE 1 and showing a film of liquid associated with the device at this section.

FIGURE 3 is a diagrammatic representation of a measuring system forming a part of the device.

FIGURE 4 is a plan view of a section of a continuous graph illustrating a typical operation of the device for indicating changes in the amount of detergent in laundry liquids.

The surface tension indicating device shown in the drawings comprises a base member 10 provided with a rigid post 11 extending upwardly therefrom adjacent the rear of the base member. Adjacent the front of the base member is a second post 12 also extending upwardly therefrom but to a height less than that of the rear post 11. Extending forwardly from the rear post 11 to points adjacent the front post 12 are two pairs of spaced leaf springs 13 and 14 with the springs being normally parallel to each other and extending essentially horizontal and with the two pairs of springs 13 and 14 being spaced vertically apart. Mounted on the forward ends of the springs 13 and 14 is a vertically arranged movable member 15 that is reciprocable in a horizontal path when a force is applied thereto sufficient to deflect the two pairs of springs 13 and 14.

Mounted at the top of the rear post 11 is a feed structure 16 into and through which may be fed two streams of liquid, the outlet of the first stream being illustrated at 17 and the outlet of the second stream being illustrated at 18. Immediately in front of the feed structure 16 and also supported by the rear post 11 is a transverse support 19 to which are attached the upper ends of a pair of forwardly and downwardly curved troughs 20 and 21. These troughs are formed of spaced apart approximately parallel wires 22 and 23 for the trough 20 and 24 and 25 for the trough 21. The two pairs of wires extend forwardly of the support 19 from an almost horizontal upper end beneath the outlets 17 and 18 to a downwardly extending approximately vertical section. These approximately vertical sections of the wires 22 and 25 which are the outer wires of the two pairs extend to the base member 10 and have their ends located in wells 26 and 27 in this base member. The inner wires 23 and 24 terminate as illustrated at the ends 28 and 29 a considerable distance above the base member 10 and above the movable member 15. The wires 23 and 24 adjacent the ends 28 and 29 are approximately vertical.

Substantially aligned with the wires 23 and 24 are a pair of approximately vertically arranged wires 30 and 31 with the upper ends of the wire 30 being located adjacent and beneath the end 28 and the upper end of the wire 31 being located adjacent and beneath the end 29. The two wires 30 and 31 are at least approximately aligned with the wires 23 and 24, respectively.

The lower ends of the wires 30 and 31 terminate short of the wells 26 and 27. The wire 31 is substantially aligned with a short wire 32 directly beneath this lower end and extending into the well 27. The wire 30 is similarly provided with a short wire (not shown) extending into the well 26. The wire 32 is supported on the front post 12 by a sag wire 33, while the corresponding wire within the well 26 is similarly supported by a corresponding support wire (not shown). The wires 30 and 31 are supported on opposite sides of the movable member 15 by means of support wires 34 extending outwardly from the oppoiste sides of the movable member 15. The wires 30 and 31 and the member 15 to which they are attached therefore are movable as a unit. The wires 30 and 31 are located inwardly of their respective continuous wires 22 and 25. Thus the movements of the wires 30 and 31 are always opposite to each other with respect to the companion wires 22 and 25. In other words, when the wire 30 reaches toward the wire 22 and wire 31 moves away from its wire 25.

Associated with the base member 10 are a pair of rear supporting feet 35 located adjacent the rear corners of the base and a pair of adjustable front supporting feet 36 located adjacent the front corners of the base 10.

Positioned adjacent the top of the front post 12 is a horizontally arranged differential transformer 37 having a movable core 38 (FIGURE 3) attached by means of a stem 39 and mounting bracket 40 to the movable member 15.

When two liquids are conveyed from the outlets 17 and 18 into the troughs 20 and 21, they flow downwardly in the troughs and each forms a film after flowing past the termination of the troughs. This film first extends between the wires 22 and 23 and 24 and 25 and on continuing flowing the films form between the wires 22 and 30 and 25 and 31 as indicated at 41 in FIGURE 2. Because of the surface tension of these two films they exert a pull on the movable wires 30 and 31 tending to move each of these wires toward its respective fixed wire 22 or 25. Because of the above-described arrangement of the wires, one of these forces, of course, tends to nullify the other so that the force exerted by the surface tension of these films on the movable member 15 is the difference between the surface tension of the films and thus the member 15 will move in the direction of the stronger film. Thus, the device is usable to indicate the relative surface tension of an unknown film as compared to that of a known film such as water.

In order to indicate the resulting surface tension differential between the two films, means are provided for indicating the extent of movement of the member 15 under the differential surface tension force. In the illustrated embodiment, as shown in FIGURE 3, the transformer has combined primary and secondary windings which are merely indicated diagrammatically in FIGURE 3. The particular differential transformer indicated here is a Schaevitz Engineering Type 040 MS–L. This transformer has one primary and two identical secondary windings wound axially so that the primary has a secondary winding on each end. As indicated, the transformer body 37 is held stationary and the magnetic core 38 which is operably attached to the movable wires 30 and 31 is located therewithin. The transformer primary is operated from a calibrated, constant, alternating current source. The core must be accurately centered and when so centered the currents induced in the secondarys are identical, so that they are connected to balance each other and give a zero output. Then when the core is displaced even slightly in either direction this balance no longer exists and the secondarys produce a net output, the polarity and magnitude of which indicate the direction and distance of the deflection. The transformer used in the embodiment of the invention has a linear measuring range of 0.04 inch in each direction from the central position of the core 38, or the balance or "zero" position. The output of the transformer 37 is connected to a combined preamplifier and amplifier 43. This unit supplies the differential transformer 37 with a calibrated, alternating current reference signal and subsequently receives, detects and amplifies the return signal. This amplified return signal is fed to the recorder 44 which in the embodiment illustrated is a Brown Electronik recorder.

The electrical network interconnecting amplifier 43 and recorder 44 includes a voltage divider network composed of resistors 46a and 46b with the latter resistor being connected to a common ground bus interconnecting units 43 and 44. As will be apparent from the illustrative 40,000 ohm and 4,000 ohm resistance values of resistors 46a and 46b, only a small portion of the signal from amplifier 43 is picked off this divider network.

Connected in parallel with each other and connected to the junction between resistors 46a and 46b are the bias battery 47 and the 100,000 ohm potentiometer 48, the latter of which serves as a "zero" adjustment means for positioning the stylus 51 of recorder 44 on the designated portion of recorder paper used in recorder 44.

The moveable "zero" adjustment arm of potentiometer 48 is connected in turn to a second set of voltage divider resistors 49a and 49b having illustrative values of 100,000 ohms and 300 ohms respectively, the signal fed to recorder 44 being tapped from the junction of these resistors.

Also connected between the "zero" adjustment arm of potentiometer 48 and the common ground bus is the electrical damping device designated by the numeral 50. Damping device 50 is provided with a series of positions $a$, $b$, $c$, $d$ and $e$, each of which, with the exception of position $a$, is connected to a capacitor of a different value. It will be noted that position $a$ is not attached to any condenser and therefore provides a "no damping" position.

Damping device 50 provides an adjustable electrical damping for the signal originating from the differential transformer 37 which, of course, is controlled by the surface tension conditions. This damping is used to eliminate from recorder 44 false or spurious "noise" signals coming from the film strength sensing mechanism.

The network also provides for connecting a high voltage output of the amplifier to the low voltage input recorder by taking only a small portion of the amplifier output and feeding it to the recorder 44. In the embodiment illustrated, for example, the signal fed to recorder 44 varies between 0 and 10 millivolts. It is also important to note that since the amplifier output is superimposed upon a high direct current voltage, the network also provides a "bias" voltage which is substracted from the amplifier output, so that the recorder will be recording only that portion of the amplifier system which is of interest in indicating the change in surface tension. The positioning control, as indicated at 48 permits positioning the stylus 51 of the recorder at any desired point of the recorder scale.

The bias battery used with the network is operated under low current drain conditions so that only infrequent replacement is necessary.

As indicated in the above description, the measuring system illustrated at FIGURE 3 includes standard parts connected in a well known manner in order to set up an electric current variable as the distance of movement of the movable member 15 which in turn is movable under the influences of the differential surface tensions. This electric current operates recording stylus 51 of the recorder 44 to inscribe a path on a movable recording paper 52 which moves in the direction of the arrow 75 shown in FIGURE 4. A typical pattern for a combination washer-dryer is illustrated in FIGURE 4. The path 53 shows the path of the marking stylus 51, while the two closely adjacent paths 54 indicate the temperatures of the two films. These temperatures are also indicated in a normal manner by two marking styluses (not shown).

When the device is operated using only water to form both films the path is that illustrated at 55. A line 56 which as shown is sloped can then be drawn to show the zero line for the reference water. During the operation of the combined washer-dryer, water flows from one outlet such as the outlet 17 and laundry liquid from the machine flows through the outer outlet such as the outlet 18. As described the two films form films between the wires 22 and 30 and 25 and 31. As shown, as a wash cycle is begun the stylus positions itself, as indicated at 57 on the chart of FIGURE 4, to indicate the surface tension differential between the laundry liquid and the reference water. Then at the end of the washing cycle, when the liquid is withdrawn from the laundry device, the stylus line drops to a point adjacent the reference line 56 or to a position as indicated at 58. In order to keep the stylus on the paper the scale at 57 is an X50 scale, while the scale at the position 58 is an X20 scale. This shift is made at the end of the wash cycle.

The laundry equipment is then operated through a first rinse cycle where, because of detergent remaining in the wash articles, the stylus moves to the position indicated at 59 or away from the reference line 56 for plain water. The rinse water is then removed from the articles as by spin drying, and the stylus immediately moves back toward the reference line 56 as indicated by the path 60. The approach of the stylus on the path 60 toward the reference line 56 indicates that the rinse water is being removed. Immediately after this, there is a second rinse cycle again with plain water, whereupon the stylus moves away from the reference line 56 as indicated by the line 61 but considerably short of the portion 59 of the path. There is again a spin dry cycle, as indicated at 62, followed by a third rinse cycle, as indicated at 63; because this portion 63 of the stylus path is so close to the reference line 56, this third rinse is the last rinse and is followed by another spin dry cycle during which the path of the stylus moves over to correspond with the reference line 56.

As explained above, the scale can be varied in order to accommodate the movement of the stylus 51 on the paper. Thus, when the wash cycle is started as indicated at 64, the scale is X20 and the stylus is on the reference line 56. It has been moved there from the initial position 64 in order to set the zero line. Then, when the detergent is added at the portion of the cycle indicated at 65, the stylus immediately moves over to the position indicated at 57, but in the meantime the scale has been set to X50 for operation during the wash cycle. However, as explained above, as soon as the wash cycle is completed the stylus moves to the position shown at 58 and the scale is set to X20 again.

In the preferred embodiment the distances between the pairs of wires 22—30 and 31—25 does not exceed about 1/8 inch. In fact, in order to assure a continuous bubble-free film of the two liquids it is preferred that this distance taper from 1/8 inch at the top of the movable wires 30—31 to about 3/16 inch at the bottom. Because the device balances the known film against the unknown film, it clearly indicates the continuous change in surface tension of the unknown film. Because the temperatures of the two films are not important, as long as they are approximately the same, it is preferred that the two liquids emerging from the outlets 17 and 18 be at the same temperature. This is preferably done by providing heat exchange equipment (not shown) in the feed structure 16. As mentioned earlier, the zero reference line 56 which is the approximate line for plain water indicates a drift which can be easily seen in FIGURE 4. This drift appears to be caused by small temperature changes in parts of the device. These temperature changes are so small that they are not important. The measurements made by the device of this invention are based on the deflection caused by the surface tension forces of two liquid films each tending to cancel out the other. In the illustrated embodiment of the invention, the maximum surface tension force encountered totals about 2 grams which is the equivalent of a surface tension unbalance of about 40 dynes per centimeter. Flow through the outlets 17 and 18 should be regulated so as to flow as nearly as possible at the same rate.

Before the device is put in operation, it is preferably centered on a supporting surface that is substantially isolated from vibration. This leveling can be achieved by the leveling screws 36. The device should then be inclined forwardly at an angle of 1 or 2° from vertical for best operation. In operation, the two liquids flow into the wells 26 and 27 and from there they flow through outlets 67 and 68. The X20 scale, as discussed above in conjunction with FIGURE 4, gives a much greater sensitivity of course than does the X50 scale. In the particular embodiment described herein, this X20 scale is equivalent to a force of one dyne per centimeter per inch of recorded scale.

While circular wires have been illustrated in FIGURE 2 of this disclosure for sensing film strength, it will be appreciated that other cross sectional configurations may be used to sense the surface tension forces of films passing between these wires. For example, elliptical and teardrop shaped cross sectional wires have been found to be satisfactory. Wires with square cross sections may also be used.

It should be fully understood that the illustrated device is capable of compensating for temperature variations of the fluid being sensed so long as both films passing through this sensing instrument are kept approximately at the same temperature level and so long as both films are of the same general composition. This temperature compensation is inherent in the operation of this device since the films are acting against each other through a common member.

While not shown in FIGURE 1, the forced oscillations of the spring supported rods 30 and 31 have been in practice controlled by attaching a dash pot to member 15 to damp out these oscillations. It will be noted that this mechanical method of damping varies from the electrical damping in function as well as in construction.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A device for continuously indicating changes in the dynamic surface tension of a liquid, comprising: a pair of spaced apart members capable of supporting a liquid film; means for continuously flowing liquid between said members to form said liquid film therebetween; and means for continuously indicating the changing forces exerted on said members due to the surface tension of said liquid film.

2. A device for continuously indicating changes in the dynamic surface tension of a liquid, comprising: a pair of spaced apart members capable of supporting a liquid film, at least one of which is movable; means for continuously flowing liquid between said members to form said liquid film therebetween; and means for continuously indicating the changing forces exerted on said members due to the surface tension of said liquid film causing movement of said movable member.

3. A device for continuously indicating changes in the surface tension of a liquid, comprising: a pair of spaced apart members capable of supporting a liquid film therebetween; one of said members being movable as a result of film surface tension acting thereon; means for flowing a liquid between and from said members to form a flowing film therebetween; and means for indicating the extent of movement of said movable member as an indication of said surface tension.

4. A device for indicating the surface tension of a first unknown liquid as compared to the surface tension of a second known liquid, comprising: first and second pairs of spaced apart members, one member of each pair being movable; means interconnecting said movable members for movement as a unit; means for applying a film of said first liquid between said first pair of members; means for applying a film of said second liquid between said second pair of members; and means variable with the extent of movement of said unit as an indication of the differential between the surface tension of said liquids whereby an indication of the surface tension of said first liquid is achieved.

5. A device for continuously indicating the surface tension of a first unknown liquid as compared to the surface tension of a second known liquid, comprising: first and second pairs of spaced apart members, one member of each pair being movable; means interconnecting said movable members for movement as a unit; means for continuously applying a film of said first liquid between said first pair of members; means for continuously applying a film of said second liquid between said second pair of members; means variable with the extent of movement of said unit as an indication of the differential between the surface tension of said liquids whereby an indication of the surface tension of said first liquid is achieved; and a recording means continuously operated by said variable means for recording said differential, the recording means having means thereon for indicating the relative surface tension of said second liquid as are reference.

6. A device for continuously indicating the surface tension of a first unknown liquid as compared to the surface tension of a second known liquid, comprising: first and second pairs of spaced apart members arranged approximately vertically, one member of each pair being movable; means interconnecting said movable members for movement as a unit; means for continuously applying a film of said first liquid between said first pair of members including a pair of feed members spaced at least approximately similarly to said first pair of spaced apart members and substantially aligned therewith and closely adjacent thereto; means for continuously applying a film of said second liquid between said second pair of members including a pair of feed members spaced at least approximately similarly to said second pair of spaced apart members and substantially aligned therewith and closely adjacent thereto; means variable with the extent of movement of said unit as an indication of the differential between the surface tension of said liquids whereby an indication of the surface tension of said first liquid is achieved; and a recording means continuously operated by said variable means for recording said differential, the recording means having means thereon for indicating the relative surface tension of said second liquid as a reference.

7. A device for continuously indicating changes in the dynamic surface tension of a liquid, comprising: a pair of adjacent but spaced apart members wettable by said liquid; means for continuously flowing a film of said liquid to, between and from said members, the film being supported only by said members when therebetween; and means for continuously indicating the changing forces exerted on said members due to the surface tension of said liquid film.

8. A device for continuously indicating changes in the dynamic surface tension of a liquid, comprising: a pair of adjacent but spaced apart relatively movable members wettable by asid liquid; means for continuously flowing a film of said liquid to, between and from said members, the film being supported only by said members when therebetween; and means for continuously indicating the changing forces exerted on said members due to the surface tension of said liquid film causing relative movement of said members.

9. A device for continuously indicating changes in the surface tension of a liquid, comprising: a pair of adjacent but spaced apart members wettable by said liquid, one of said members being movable as a result of film surface tension acting thereon; means for continuously flowing a film of said liquid to, between and from said members, the film being supported only by said members when therebetween; and means for continuously indicating the extent of movement of said movable member as an indication of said surface tension.

10. A device for indicating changes in the surface tension of a liquid, comprising: a pair of spaced apart, generally vertical, relatively movable members wettable by said liquid; means for flowing by gravity a film of said liquid down between said pair of members; and means variable with the extent of relative movement of said members as an indication of the surface tension of said liquid.

11. A device for indicating changes in the surface tension of a liquid, comprising: a pair of spaced apart, substantially vertical, relatively movable members wettable by said liquid; means for flowing by gravity a film of said liquid down between said pair of members; means variable with the extent of relative movement of said members as an indication of the surface tension of said liquid; and a recording means continuously operated by said variable means for recording said surface tension indication.

12. A device for indicating changes in the surface tension of a liquid, comprising: a pair of spaced apart relatively movable members arranged approximately vertically; means for continuously applying a film of said liquid between said members, said means for applying being substantially aligned with said members and closely adjacent thereto; means variable with the extent of relative movement of said members as an indication of said surface tension; and a recording means continuously operated by said variable means for recording said surface tension indication.

References Cited in the file of this patent
UNITED STATES PATENTS

| | | |
|---|---|---|
| 1,960,224 | Schoenberg | May 22, 1934 |
| 2,627,177 | Vonnegut | Feb. 3, 1953 |
| 2,895,329 | Hettche et al. | July 21, 1959 |